United States Patent
Camilo-Martinez et al.

(10) Patent No.: US 8,016,084 B2
(45) Date of Patent: *Sep. 13, 2011

(54) BRAKE PAD FOR A DISC BRAKE

(75) Inventors: José Camilo-Martinez, Unterhaching (DE); Michael Mueller, Rohrenfels (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/140,114

(22) Filed: Jun. 16, 2008

(65) Prior Publication Data
US 2009/0020380 A1 Jan. 22, 2009

Related U.S. Application Data

(63) Continuation of application No. PCT/EP2006/011997, filed on Dec. 13, 2006.

(30) Foreign Application Priority Data

Dec. 14, 2005 (DE) .......................... 10 2005 060 177
Jul. 27, 2006 (DE) .......................... 10 2006 034 764

(51) Int. Cl.
F16D 65/04 (2006.01)
(52) U.S. Cl. ............... 188/73.38; 188/73.31; 188/250 G
(58) Field of Classification Search ............... 188/73.36, 188/73.37, 73.38, 73.1, 205 A, 250 E, 73.31, 188/73.32, 250 G
See application file for complete search history.

(56) References Cited

U.S. PATENT DOCUMENTS

| | | | |
|---|---|---|---|
| 2,909,246 A | 10/1959 | Hodkinson | |
| 4,049,087 A | 9/1977 | Heinz et al. | |
| 4,742,326 A * | 5/1988 | Gregoire et al. | 340/453 |
| 4,773,511 A | 9/1988 | Giering et al. | |
| 4,784,242 A | 11/1988 | Thioux | |
| 5,064,028 A | 11/1991 | Antony et al. | |
| 2004/0163899 A1* | 8/2004 | Heinlein | 188/72.1 |
| 2006/0054430 A1* | 3/2006 | Maehara | 188/73.36 |

FOREIGN PATENT DOCUMENTS

| | | |
|---|---|---|
| DE | 40 20 287 A1 | 1/1992 |
| DE | 195 15 841 A1 | 10/1996 |
| EP | 0 248 385 B1 | 12/1987 |
| EP | 0 232 303 B1 | 9/1989 |
| EP | 1 491 789 B1 | 12/2004 |
| WO | WO 87/00896 A1 | 2/1987 |

OTHER PUBLICATIONS

International Search Report dated Apr. 4, 2007 w/English translation (six (6) pages).

* cited by examiner

*Primary Examiner* — Robert Siconolfi
*Assistant Examiner* — Vu Q Nguyen
(74) *Attorney, Agent, or Firm* — Crowell & Moring LLP

(57) ABSTRACT

A brake pad for a disc brake, in particular for a commercial vehicle, has a pad retaining spring which is configured as an arcuate leaf spring and is held in a manner which is secured captively and can be deflected radially on a lining carrier plate of a brake pad which carries a friction lining. The pad retaining spring is connected in a form-fitting manner to the pad carrier plate by a hood which is fastened to the pad retaining spring.

24 Claims, 19 Drawing Sheets

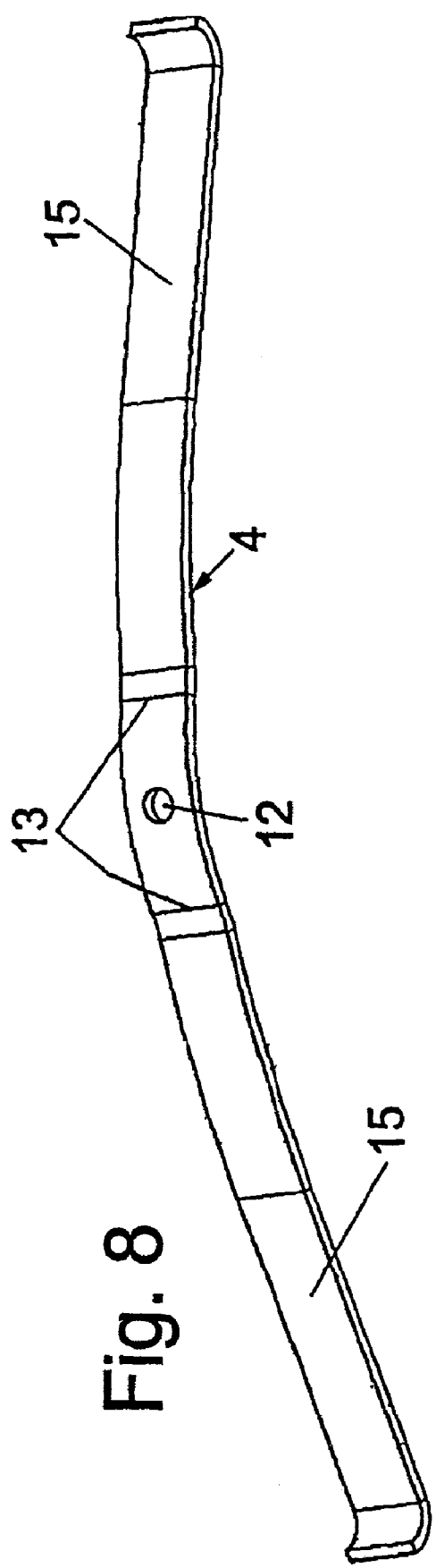
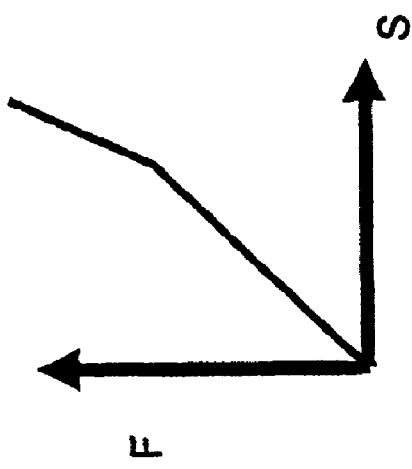

BRAKE PAD FOR A DISC BRAKE

CROSS-REFERENCE TO RELATED APPLICATIONS

This application is a continuation of PCT Application No. PCT/EP2006/011997 filed on Dec. 13, 2006, which claims priority to German Application No. 10 2005 060 177.4 filed Dec. 14, 2005 and German Application No. 10 2006 034 764.1, filed Jul. 27, 2006, the disclosures of which are incorporated by reference herein.

BACKGROUND AND SUMMARY OF THE INVENTION

The present invention relates to a brake pad for a disc brake and, in particular, to a brake pad for a commercial vehicle disc brake.

A generic-type brake pad is known from DE 40 20 287 A1. The construction, which is shown and described there, has proved itself to work properly in practice. In this case, the brake pad holder is formed so that the brake pad spring forms a grip so that the sub-assembly, which includes the brake pad spring and the brake pad, is very easy to handle, for example for installation or removal.

For fixing the pad retaining spring, lugs, which are provided with undercuts and penetrate into slot-shaped recesses in the pad retaining spring, are formed on the pad carrier plate and fit behind the undercuts in the process so that a positive lock is formed. As a result, the pad retaining spring is retained in the radial direction so that an automatic disengagement in the relaxed or partially relaxed position is excluded.

Since for fixing the pad retaining spring only two connecting points are provided, which are arranged at a distance from each other, the pad retaining spring is held in the middle when being used as a handle or grip so that the pad retaining spring functions in the sense of a carrier, which is clamped at both ends, with the tendency of bending it by a corresponding degree.

As a result of this deformation, the spring characteristic of the pad retaining spring can possibly change, which can act disadvantageously during functioning.

The production of the undercut lugs of the pad carrier plate is basically only possible by way of a mechanical machining, for example by impressing, stamping or the like. This applies equally to the formation of the slot-shaped recesses of the pad retaining spring, which can also only be formed by corresponding mechanical machining.

The invention further develops the above-mentioned brake pad so as to optimize its functional load.

By way of the invention, the effect is achieved of the pad retaining spring being clamped in a load-transmitting manner, especially in the load region, as a result of which bending of the pad retaining spring is avoided since the lever arm, which has been effective up to now, is now no longer present.

According to an especially advantageous development, a hood, by which the pad retaining spring is fastened on the pad carrier plate according to the invention, is preferably arranged in the middle region of the pad retaining spring where the force distribution is especially optimum and is rigidly connected there to the pad retaining spring, especially in a positive-locking or material-bonding manner, so that it does not become lost and cannot inadvertently spring off from the pad carrier plate.

Also, the connecting region on the pad carrier plate is preferably located approximately in its middle region, wherein a middle 30% of the pad carrier plate and of the pad retaining spring, which face each other, in each case, especially preferably the middle 10%, are to be understood as the middle region.

The positive lock between the hood and the pad carrier plate can be formed so that removal of the pad retaining spring from the pad carrier plate is only possible by destruction of the connection, which comprises the pad retaining spring and the hood. Consequently, it is ensured that when replacing the brake pad only the sub-assembly including the brake pad and brake retaining spring can be exchanged. That is to say, reuse of a previously used pad retaining spring is excluded, as a result of which an improvement of the operating safety naturally ensues.

According to an advantageous development of the invention, the pad carrier plate and the hood are provided with positive-locking parts, which correspond to each other and allow an adequate radial deflection of the pad retaining spring. For this purpose, the pad carrier plate can have radially extending recesses in which associated teeth of the hood engage with a locking effect.

For producing the installation unit comprising the brake pad and brake pad spring, fixing of the hood and, as a result, of the pad retaining spring on the pad carrier plate, is carried out by a locking tongue which, after seating of the hood on the pad carrier plate, is deformed and in an unloaded end position of the pad retaining spring abuts against a stop of the pad carrier plate.

A lug of the pad carrier plate is associated with each of the two spring legs of the pad retaining spring, which extend on both sides of the hood, and against which abuts the respective spring leg. As a result, twisting of the pad retaining spring is effectively prevented. These lugs are preferably cast on if the pad carrier plate is formed as a cast part, wherein the arrangement of the lugs can be undertaken on one side or on both sides. Apart from that, by way of the positive-locking connection of the hood to the pad carrier plate, a problem-free compensation of casting tolerances is possible without an additional machining of the pad carrier plate being necessary.

According to a further aspect of the invention, the pad retaining spring, at least inside the covering region of the hood, is provided with a more progressive spring characteristic than in the adjacent spring legs.

Because of the at least two different spring excursions, significant advantages ensue in the spring characteristic during operation compared with a pad retaining spring according to the prior art.

During "normal operation" of the disc brake, the relatively long spring legs are first effective with a low spring force, as corresponds, inter alia, to the legal requirements.

During running operation, in which as a result of heavy vibrations relatively loud rattling noises of the brake pad occur, which certainly do not signify a functional limitation but which are considered as extremely annoying, a shorter spring arm becomes effective with a relatively large spring force, as a result of which the brake pad is prevented from lifting from the brake carrier, which otherwise leads to the rattling noises.

The symmetrical supporting of the pad retaining spring by way of the hood also contributes towards minimizing of these noises, as a result of which a one-sided lifting of the brake pad from the brake carrier is prevented or reduced.

Other objects, advantages and novel features of the present invention will become apparent from the following detailed description of the invention when considered in conjunction with the accompanying drawings.

BRIEF DESCRIPTION OF THE DRAWINGS

An exemplary embodiment is described with reference to the attached drawings.

FIG. 8 shows a pad retaining spring in a perspective view;

FIG. 9 shows a force-excursion diagram of the pad retaining spring;

DETAILED DESCRIPTION OF THE DRAWINGS

Figure 18:
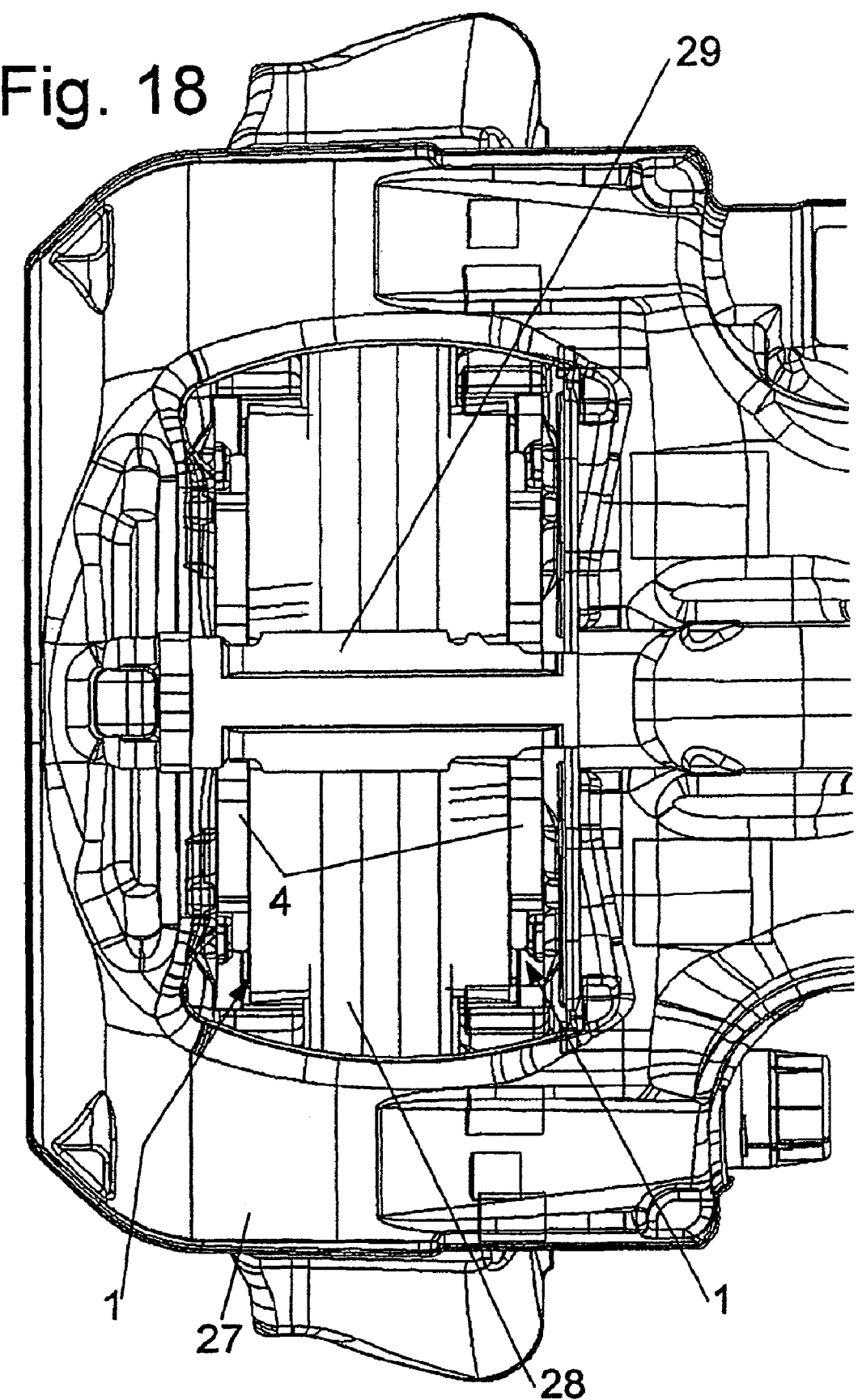
FIG. 18 shows a disc brake, which is provided with brake pads according to the invention, in a plan view.

The principal construction of a disc brake is to be seen in FIG. 18. This disc brake has a brake caliper 27, which straddles a brake disc 28 against which brake pads 1 can press on both sides. One brake pad is pressed in operation against the brake disc 28 by way of an application device, which is not shown.

For radially securing the brake pads 1, a retaining clip 29, upon which pad retaining springs 4 of the brake pads 1 are supported, is fastened on the brake caliper 27.

Figure 1:
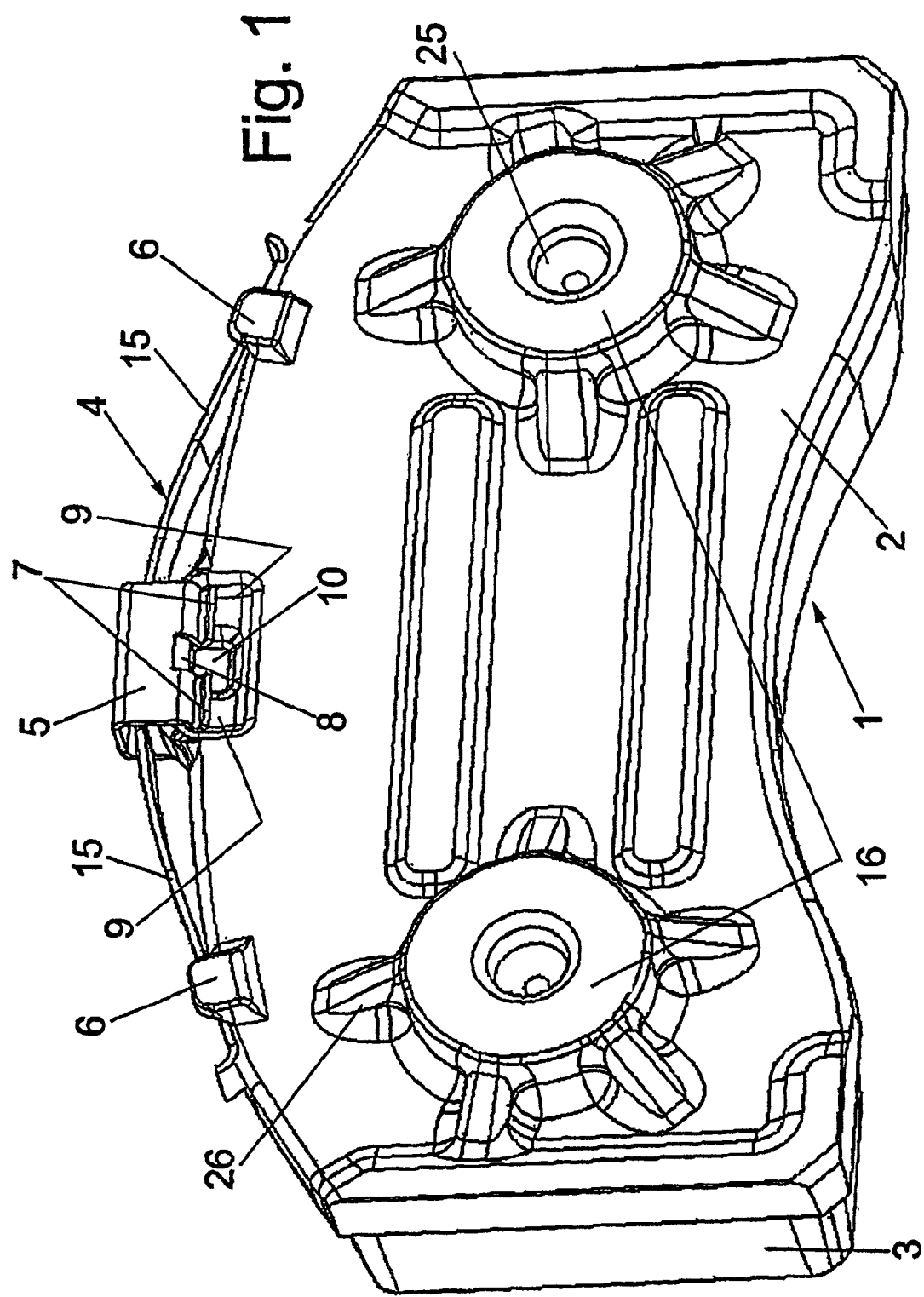
FIGS. 1 and 2 show an installed brake pad in different rear-side perspective views, in each case.
Figure 2:
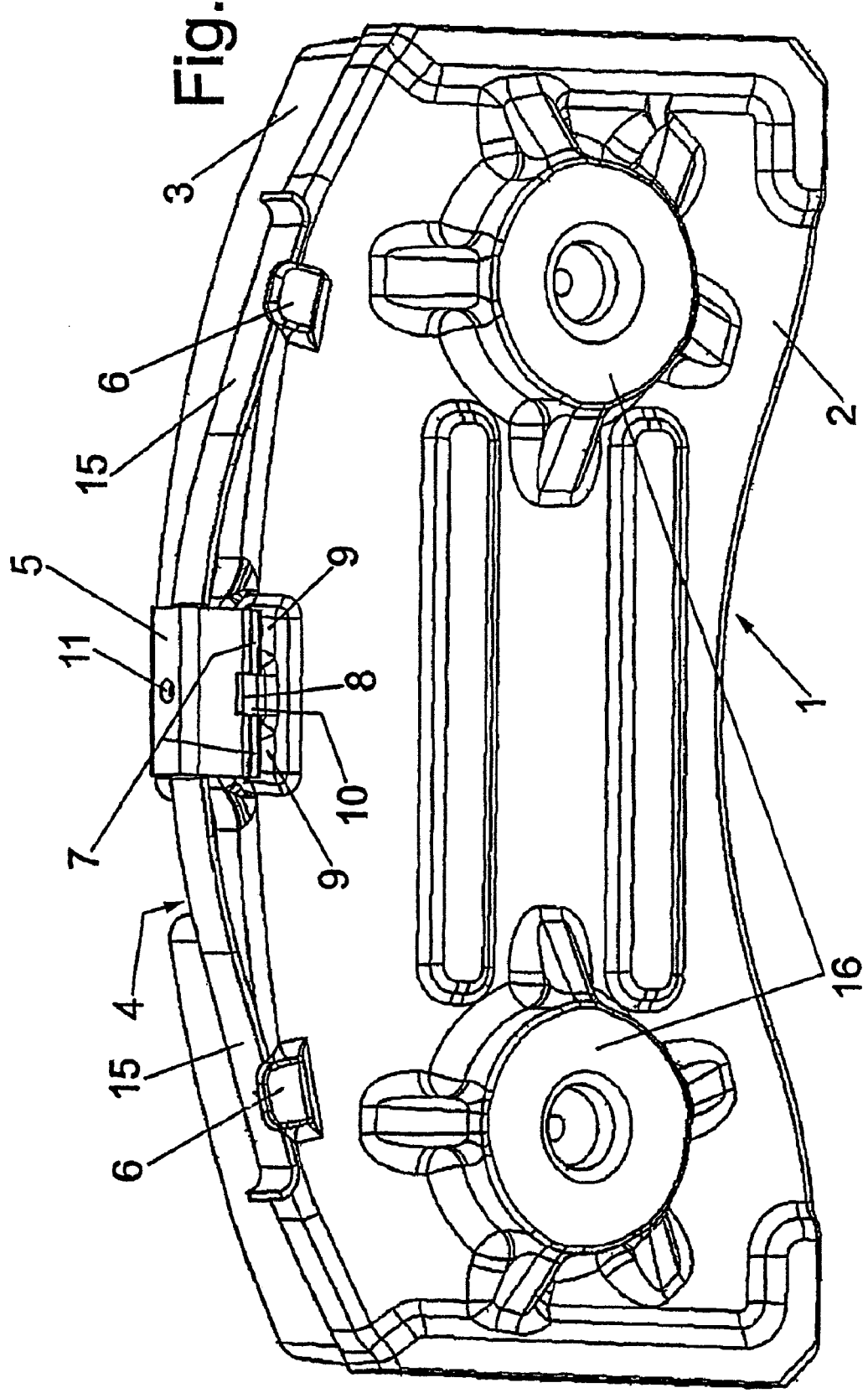
Figure 3:
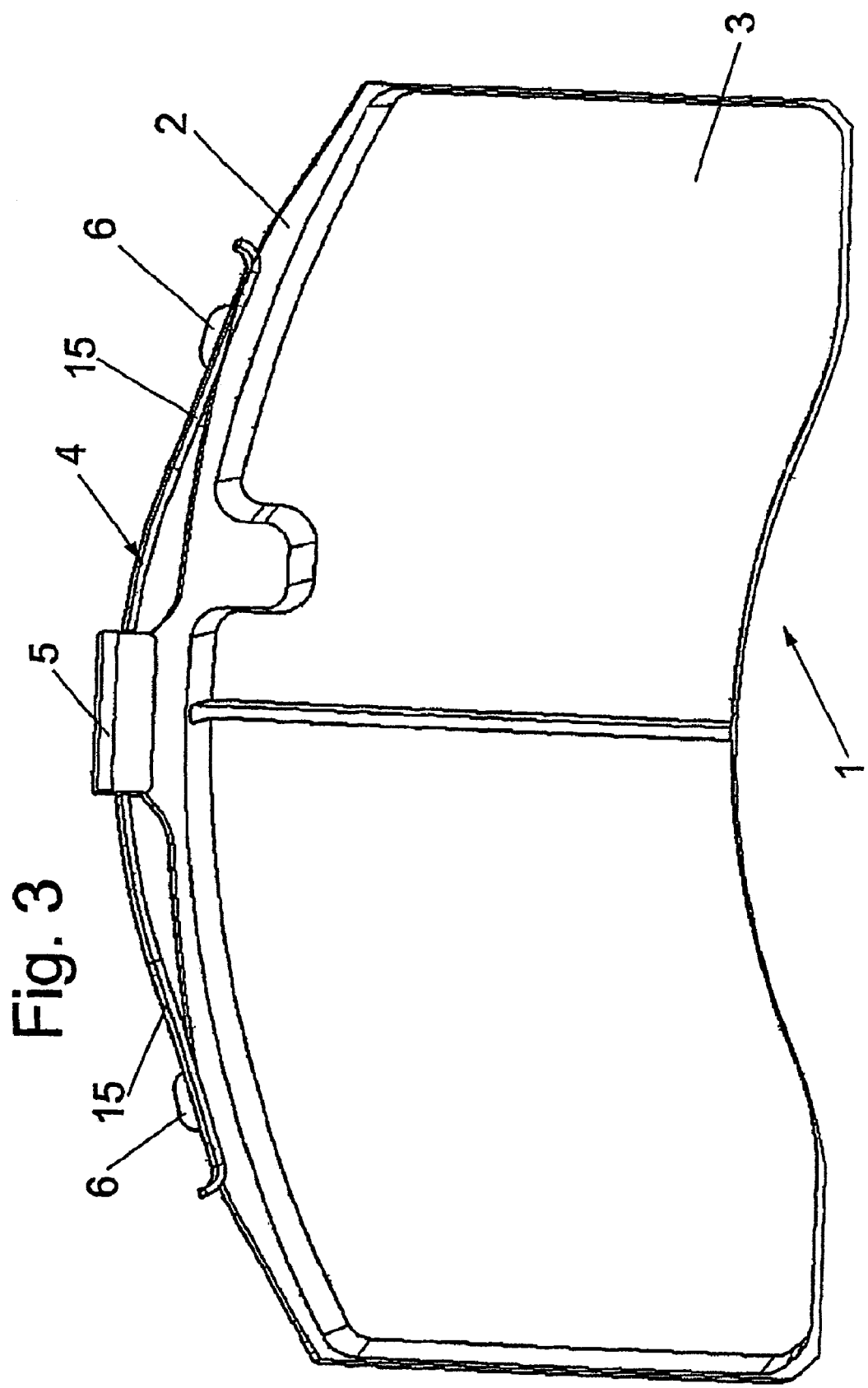
FIG. 3 shows a front view of the brake pad.
Figure 4:
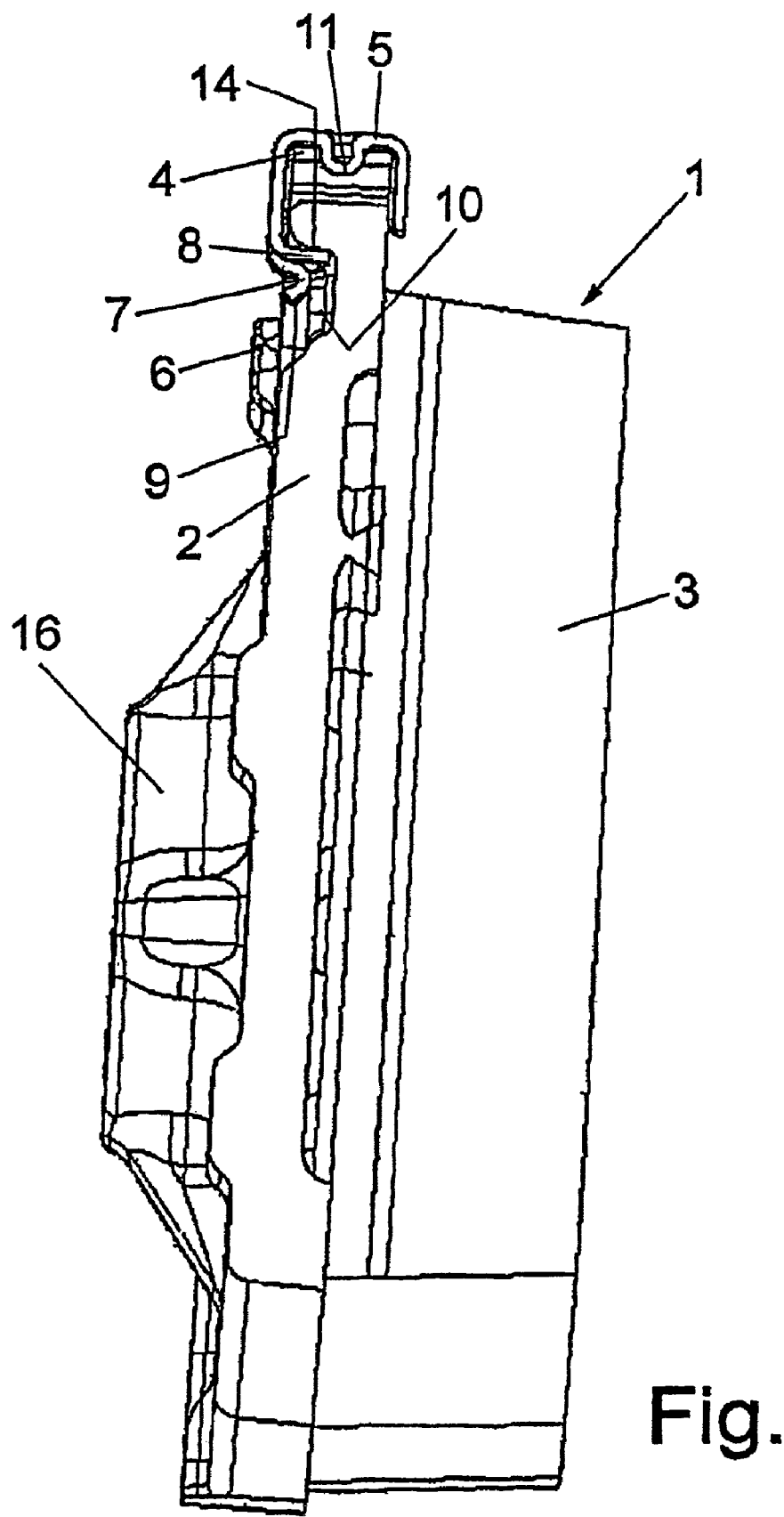
FIG. 4 shows a sectioned side view of the brake pad.
Figure 5:
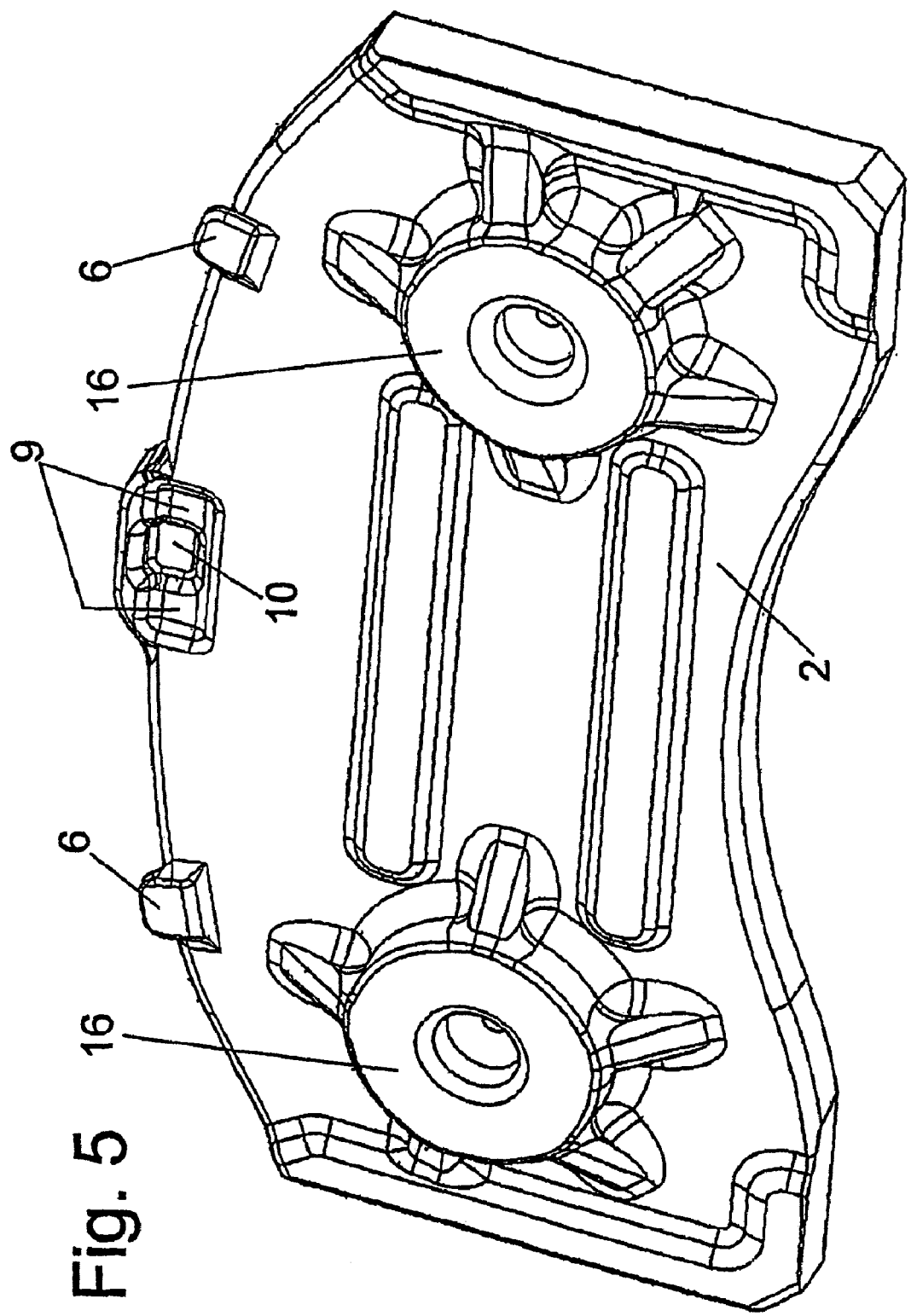
FIG. 5 shows a detail of a brake pad, also in a perspective view.

In FIGS. 1 and 2, a brake pad 1 is shown, which has a pad retaining spring 4 formed as an arc-shaped leaf spring. The pad retaining spring 4 is captively locked and retained in a radially deflectable manner on a pad carrier plate 2, which carries a friction pad 3, of the brake pad 1.

On its rear side of the pad carrier plate 2, which faces away from the friction pad 3, pressure pieces 16 are formed in one piece. The pressure pieces 16 correspond with adjusting spindles, which are not shown, of the application device of the disc brake. These pressure pieces 16 in this case are advantageously formed as annular projections, which have a central recess for engaging corresponding elements of the application device. In this case, those elements are typically end sections of adjusting spindles of the pneumatically or electromechanically operated disc brake.

On the outer periphery of the annular sections of the pressure pieces 16, radially outward extending ribs 26 are formed, the height of which decreases toward the outside. The pads are especially suitable for pneumatically operated disc brakes, for example according to the type of construction of the prior art, wherein, however, the pressure pieces are preferably advantageously also formed on the pad carrier plate 2.

In this case, the pad retaining spring 4 is connected to the pad carrier plate 2, preferably in a positive-locking manner, by use of a hood 5, which is fastened upon the spring.

Figure 6:
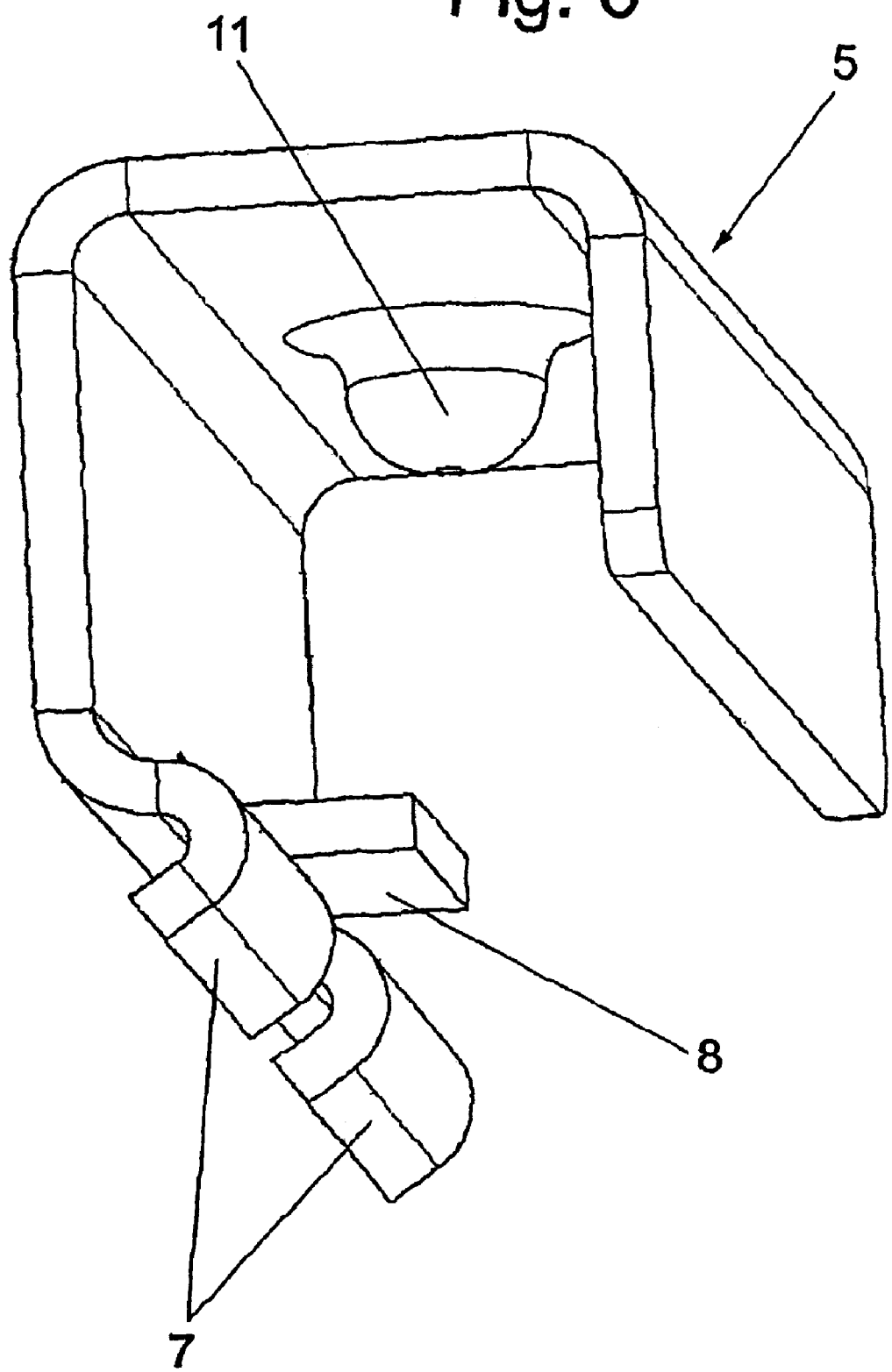
FIG. 6 shows a detail of the brake pad in a perspective view.

As FIG. 6 shows very clearly, the hood 5 in cross section is formed approximately in the shape of a U, or as a whole formed even closed, essentially rectangularly, and in an extension of one leg has two outwardly directed teeth 7, which extend at a distance to each other, while between these teeth 7 a tongue 8 is formed, which extends in the opposite direction, that is to say inwards.

Figure 7:
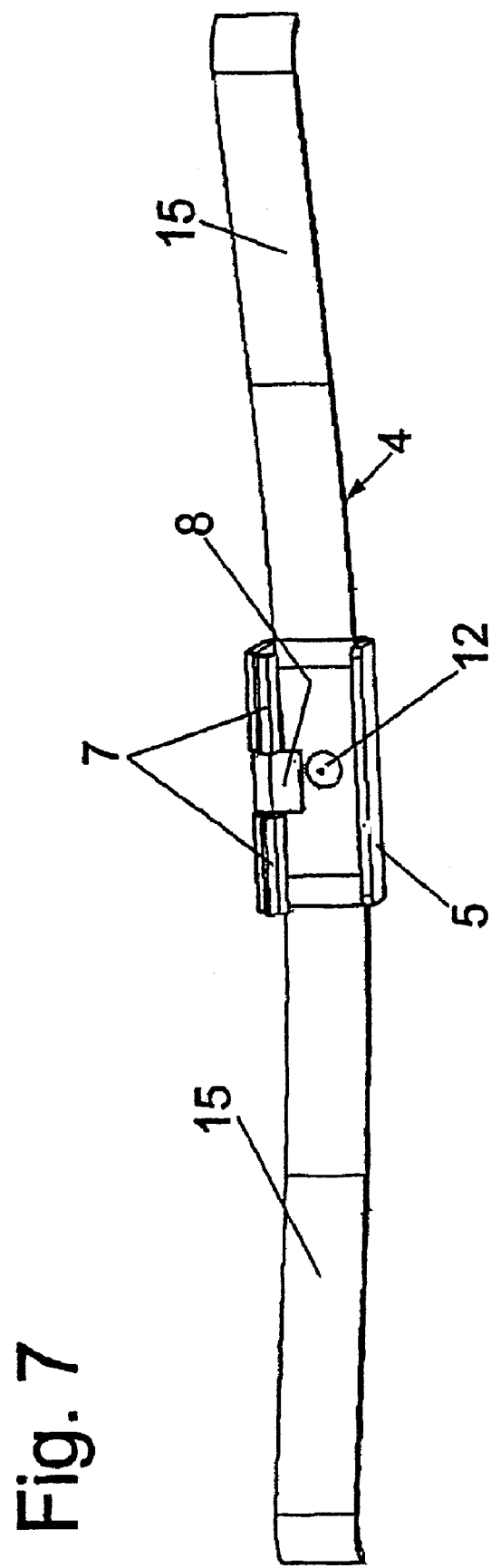
FIG. 7 shows a bottom view of a further detail of the invention.

For fastening the hood 5 to the pad retaining spring 4, an inwardly oriented boss 11 is molded on the hood 5, in the bridge section interconnecting the two parallel legs. The boss 11 is inserted into a hole 12 (FIG. 7) of the pad retaining spring 4, and then deformed so that a fixed connection of the hood 5 to the pad retaining spring 4 is provided. This connection can also be produced by other positive locks, such as rivets or the like, or by way of material bonds, such as welding or soldering.

In the case of this installation unit, which includes hood 5 and pad retaining spring 4, the tongue 8 is initially not yet bent in accordance with the view in FIG. 6, but extends in the same direction with the associated side.

For installation, the hood 5, and the pad retaining spring 4 connected to it, is seated upon the pad carrier plate 2, in an edge region. By pressing the hood 5 onto the edge region, the teeth 7 snap into slots 9 in the pad carrier plate 2, of which one slot 9 is associated with each tooth 7. The tongue 8, however, is bent in the direction of the pad carrier plate into a recess 10, which recess extends between the two slots 9 and which on the upper side is delimited by a stop 14 against which the tongue 8 abuts in an upper end position of the pad retaining spring 4. As a result, a captive locking of the unit comprising the pad retaining spring 4 and hood 5 is produced.

In this case, the slots 9 and the recess 10 are arranged on the side of the pad carrier plate 2 facing away from the friction pad 3.

For an anti-twist locking of the pad retaining spring 4, two lugs 6 are formed on one side of the pad carrier plate 2. In the present example, the lugs 6 are on the side which faces away from the friction pad 3, wherein a spring leg 15 which extends laterally to the hood 5 in each case abuts against an associated lug 6.

As shown clearly in FIG. 8, the pad retaining spring 4 in the region covered by the hood 5 (the limit of which is indicated by the region start 13) and interacting therewith, has a progressive increase of spring force, wherein the hood 5 in the load case contacts this region in a flat manner, whereas in the so-to-speak unloaded or lightly loaded position, the hood in the middle contacts the pad retaining spring 4 practically in a line, i.e. abuts against this.

In FIG. 9, a force-excursion diagram of the pad retaining spring 4 is shown. In this case, the excursion S is entered on the abscissa, while the spring force F is applied on the ordinate. It is to be seen that a long spring arm with long excursion S and relatively small spring force F first comes into effect. If this long spring excursion S is exceeded, a short spring excursion S with short spring arm, corresponding to a large spring force F, comes into effect, wherein the long spring arm is formed by the two adjacent spring legs 15 on the right and left of the region starts 13, and the short spring arm is formed by the covering region of the hood 5.

Figure 10:
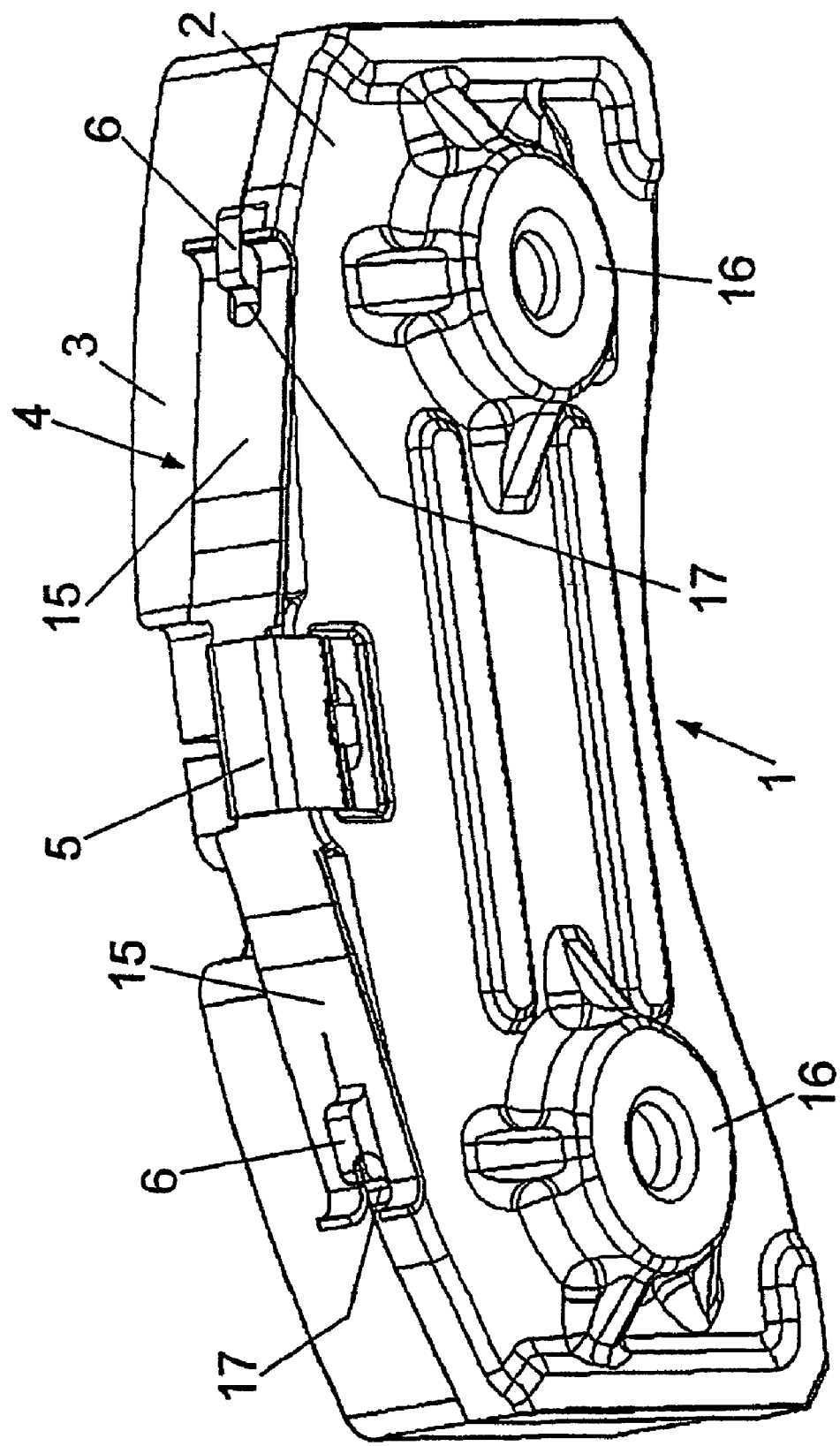
FIG. 10 shows a further exemplary embodiment of a brake pad according to the invention in a perspective view.

In FIG. 10, a further exemplary embodiment of the invention is shown, wherein the rear side of the pad carrier plate 2, which faces away from the friction pad 3 and has the formed-on pressure pieces 16, can be be seen.

In this exemplary embodiment, the two spring legs 15 on the end side have a slot 17 in each case, in which an associated lug 6 of the pad carrier plate 2 is guided and which, with regard to the thickness of the pad carrier plate 2, is arranged approximately in the middle region, so that the pad retaining spring 4 is locked in both directions, that is to say in the direction of the friction pad 3 and in the opposite direction at the same time.

Figure 11:
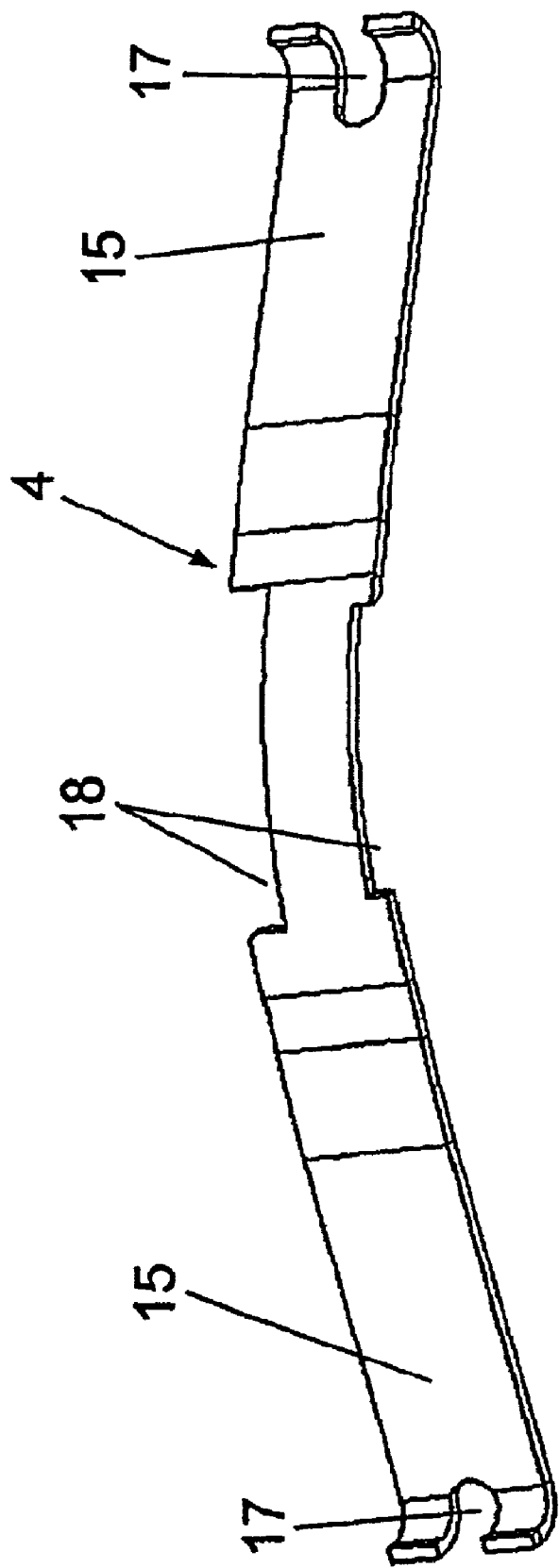
FIG. 11 shows a detail of the brake pad according to FIG. 10, also diagrammatically shown.

The pad retaining spring 4 which is formed in this sense is shown as a detail in FIG. 11. In this, it is also to be seen that the pad retaining spring 4, approximately in the covering region of the hood 5, has a cut-out 18 in each case on the longitudinal sides which lie opposite one another, in which cut-outs the two opposite sides of the U-shaped hood 5 engage. The depth of the cut-outs 18 corresponds approximately to the thickness of the associated sides of the hood 5.

Figure 12:
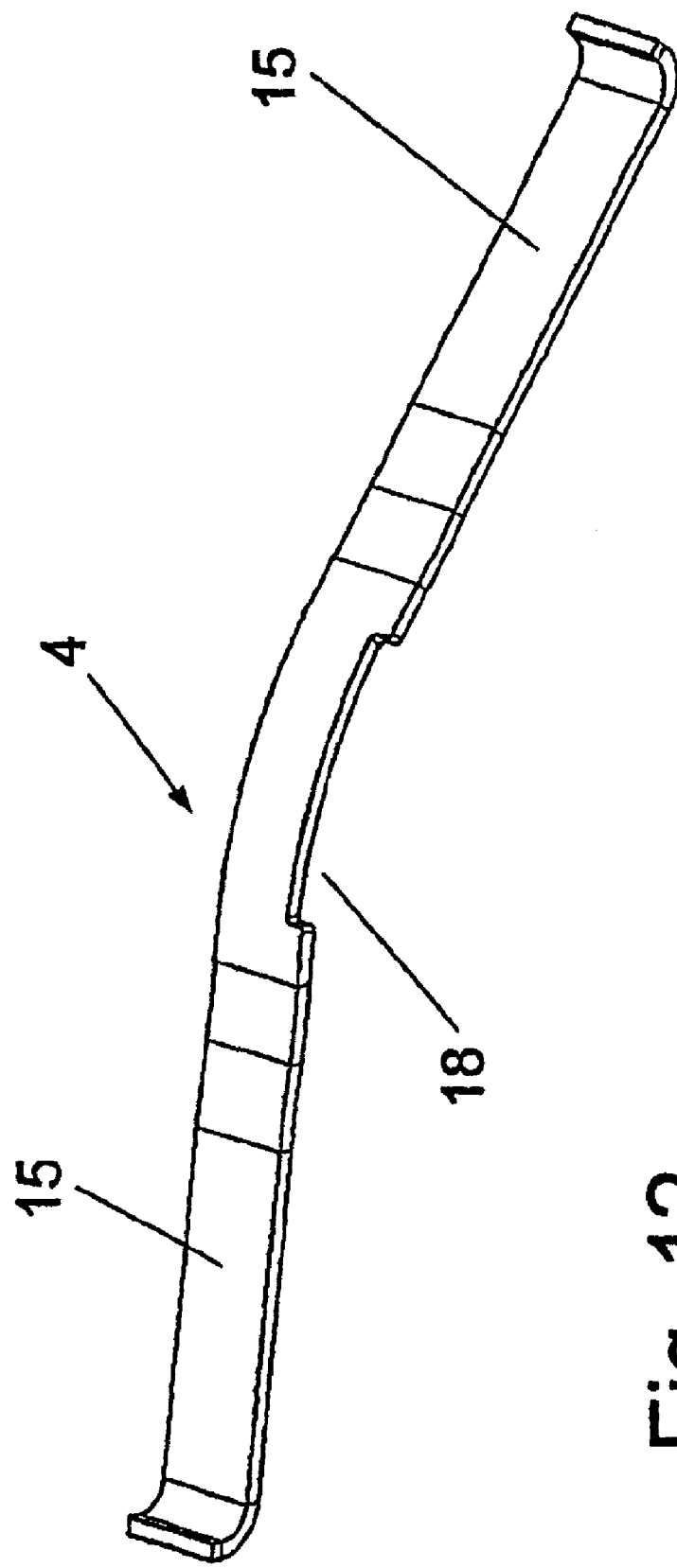
FIG. 12 shows a further exemplary embodiment of a detail of the brake pad, also in perspective view.

In FIG. 12, a further embodiment of the pad retaining spring 4 is shown. In this case, it is intended to arrange a cut-out 18 only on one of the longitudinal sides of the pad retaining spring 4, which cut-out is to be provided if the lugs 6 extend in alignment with one of the sides of the pad carrier plate 2, as this is to be exemplarily seen in FIG. 13. In this case, the longitudinal side of the pad retaining spring 4 which faces away from the lugs 6 aligns with the side of the pad carrier plate 4 which faces the friction pad 3, so that this cut-out 18 is necessary in order to achieve application of the associated side of the hood 5 on the side of the pad carrier plate 2 which faces the friction pad 3.

A cut-out 18 on both sides, which corresponds to FIG. 11, is necessary when the two longitudinal edges of the pad retaining spring 4 align with the respective associated side of the pad carrier plate 2 (FIG. 10).

Figure 13:
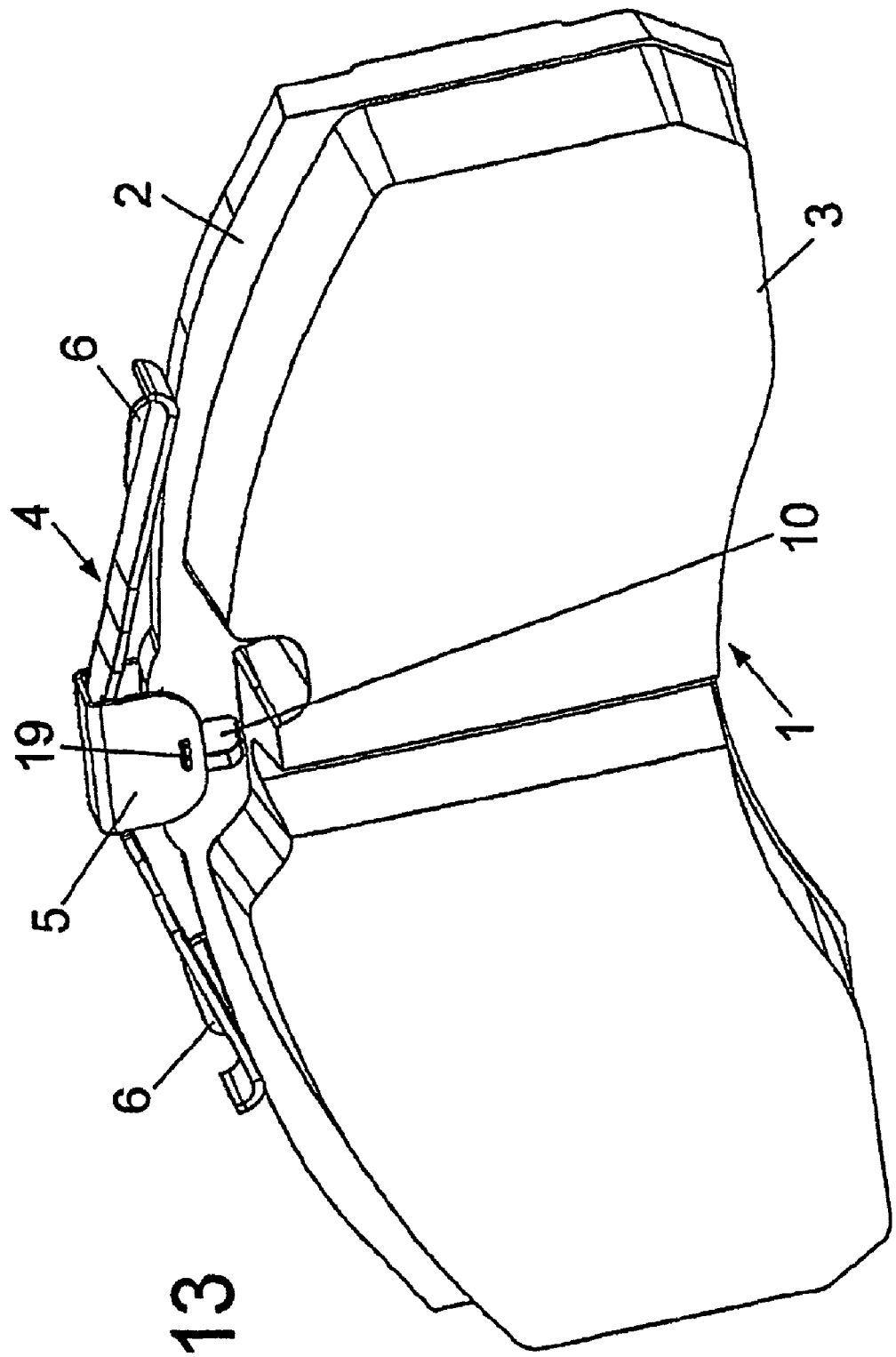
FIG. 13 shows a further exemplary embodiment of the invention in a perspective view.
Figure 14:
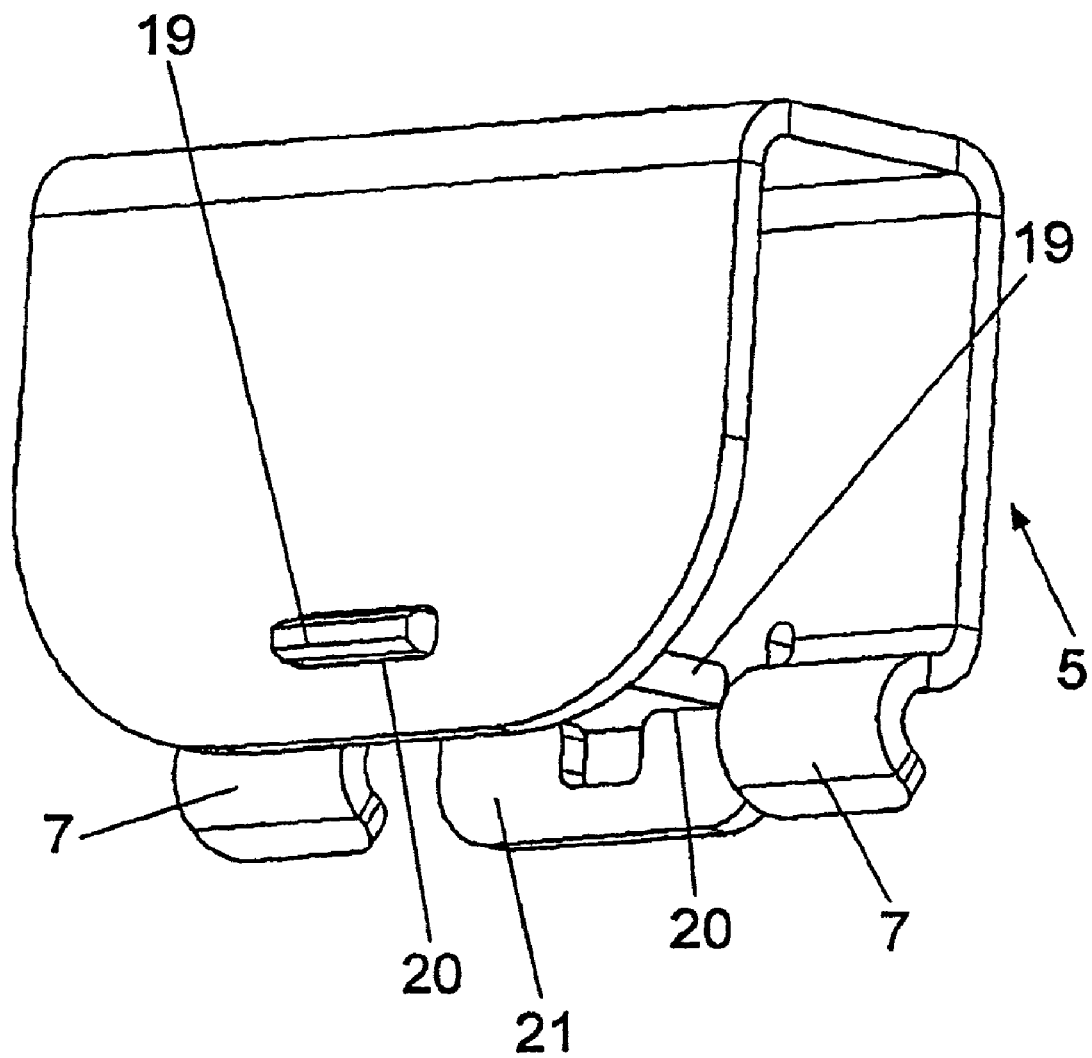
FIGS. 14 and 15 show, in each case, a further detail of another embodiment of the invention, in a perspective view.
Figure 15:
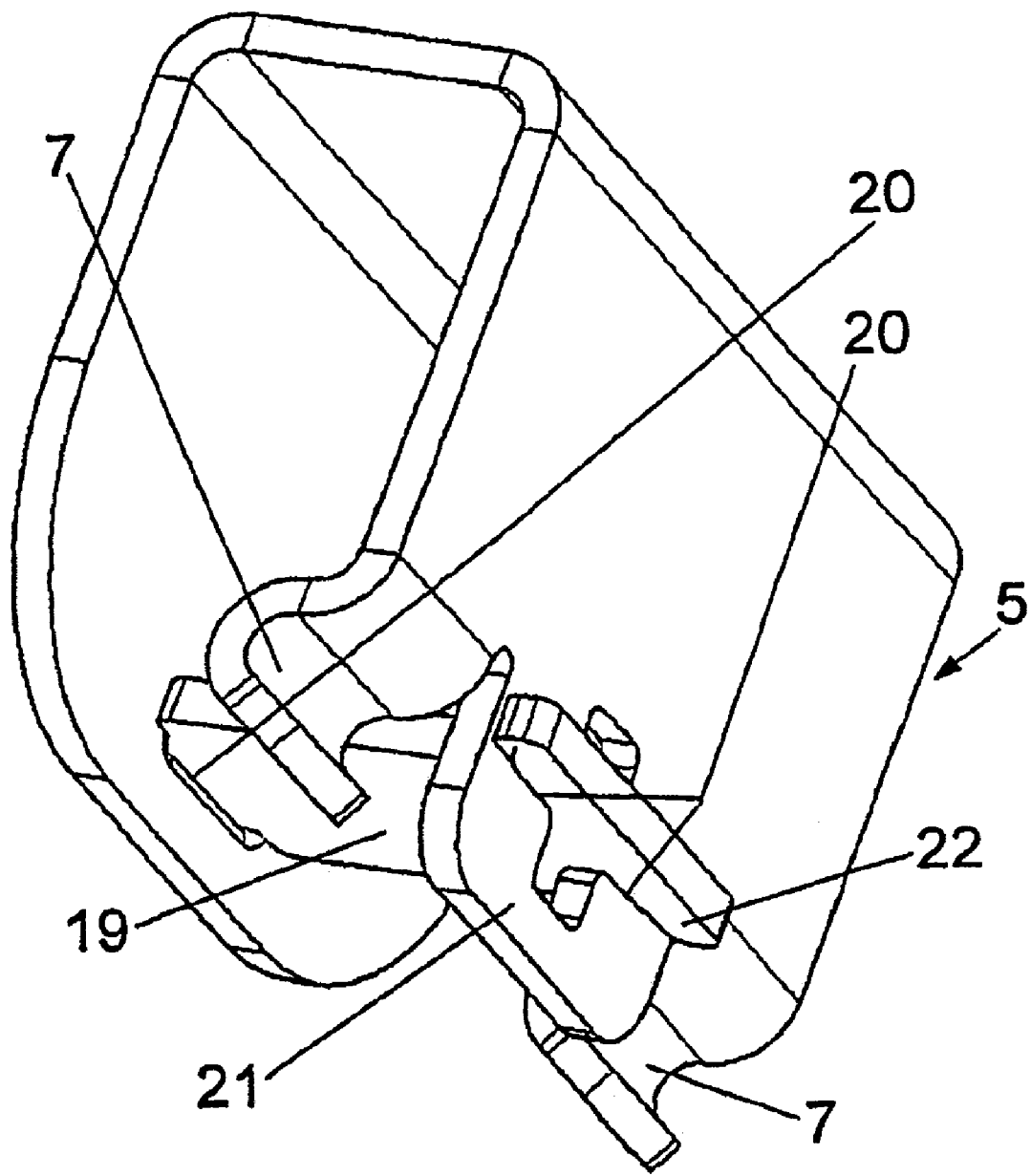

In FIGS. 13-15, it is to be further seen that the recess 10 is straight through in the sense of a hole and is penetrated by a stop plate 19 which is retained in the two opposite sides of the hood 5, for which insertion slots 20 are provided therein, into which the stop plate 19 is inserted. For limiting insertion of the stop plate 19, a stop bar 22 is formed on one end and abuts against the outer side of the side 21 of the hood 5 which is adjacent to the teeth 7. After seating of the hood 5 on the pad carrier plate 2, the stop plate 19, with the inclusion of the pad retaining spring 4, is fastened on the hood 5 by customary means, so that a fixed connection between the pad carrier plate 2 and the hood 5, is provided.

Figure 16:
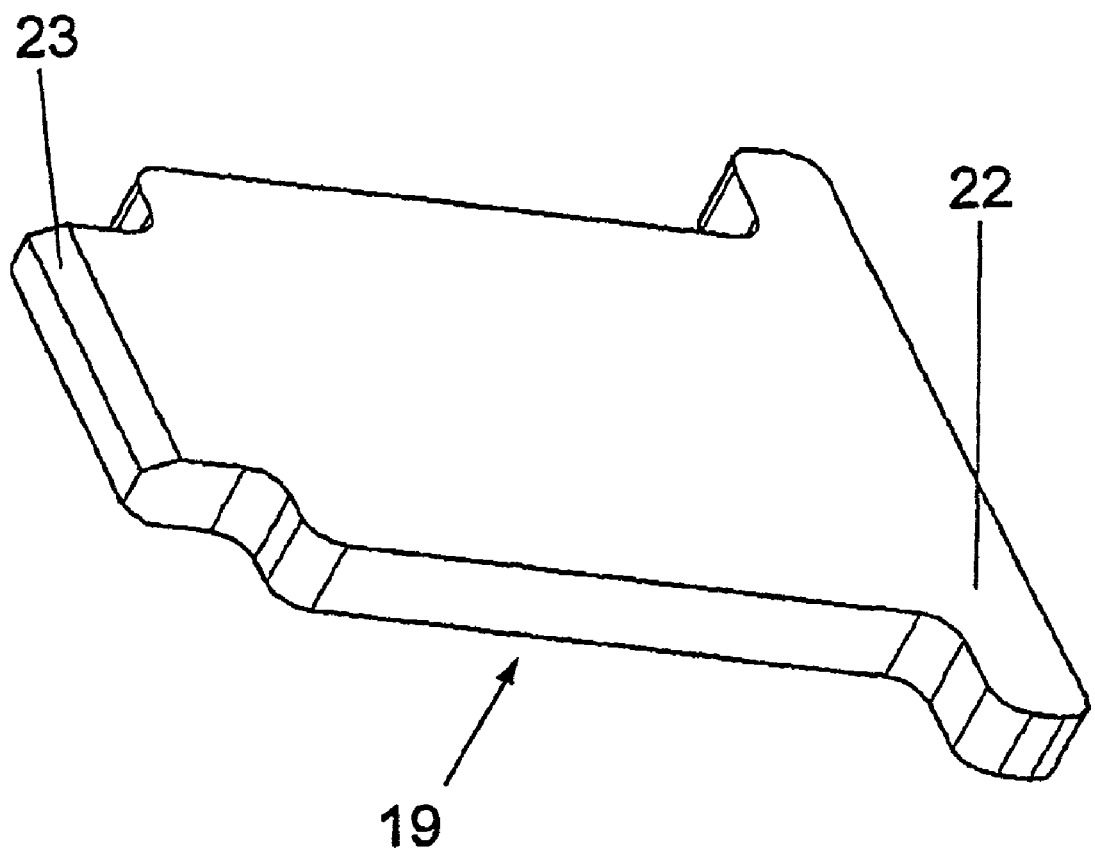
FIG. 16 shows a detail of the view corresponding to FIGS. 14 and 15 in a perspective view.

Apart from that, the stop plate 19 is shown as a detail in FIG. 16, wherein it is to be seen that the side opposite the stop bar 22 has insertion bevels 23, by which easier inserting into the associated slot of the hood 5 is possible.

Figure 17:
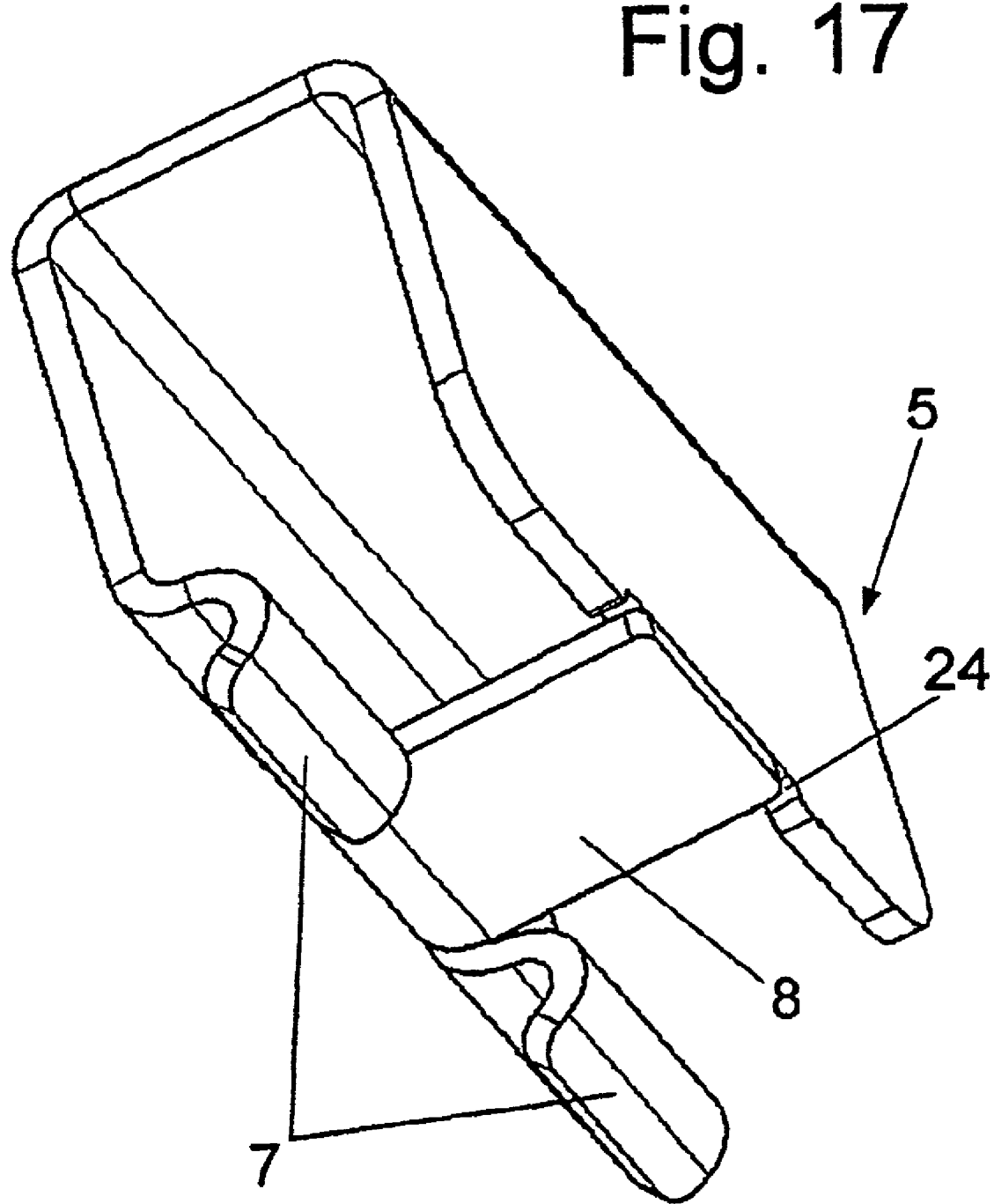
FIG. 17 shows a further exemplary embodiment of the invention, also perspectively shown.

In the case of the example which is shown in FIG. 17, the tongue 8 extends over the entire width of the hood 5, wherein, in comparison to the stop plate 19 which corresponds to FIGS. 13-15, it completely penetrates the recess 10 of the pad carrier plate 2, and on the side opposite the teeth 7 engages in a cut-out 24 of the associated side of the hood 5.

As already described for the exemplary embodiment according to FIG. 6, after seating of the hood on the pad carrier plate 2, with the inclusion of the pad retaining spring 4, the tongue 8 is bent inside the recess 10 until it engages in the cut-out 24.

Figure 19:
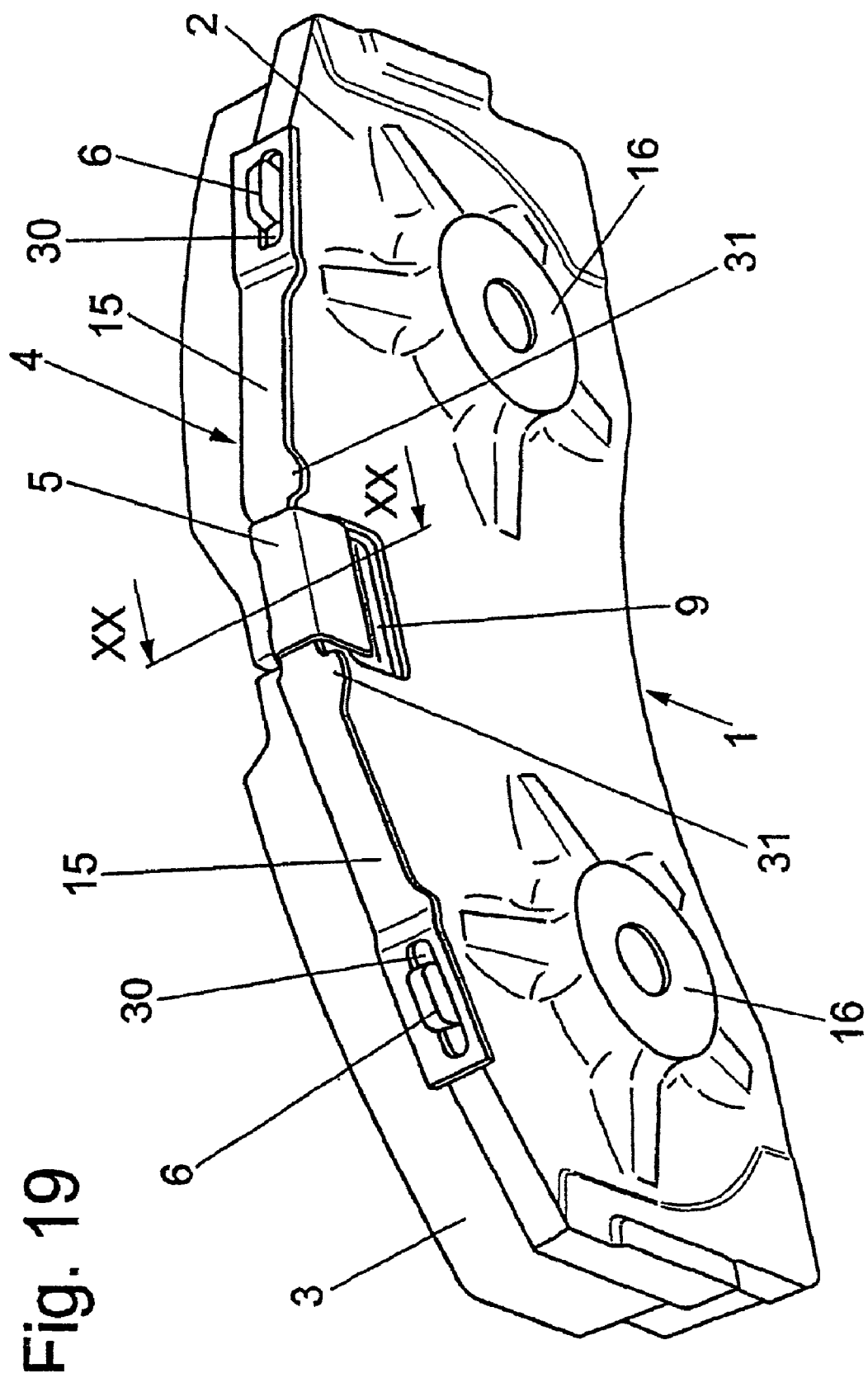
FIG. 19 shows a further exemplary embodiment of the invention in a perspective view.

In FIG. 19, a brake pad 1 is shown, in which the pad retaining spring 4 or the two spring legs 15 have, in each case, an elongated hole-shaped longitudinal slot 30, which is penetrated by the associated lugs 6 so that the displacement excursion of the leg 15 is limited on both sides. For this purpose, each longitudinal slot 30 is correspondingly larger in its length than the length of the respective lug 6.

Figure 20:
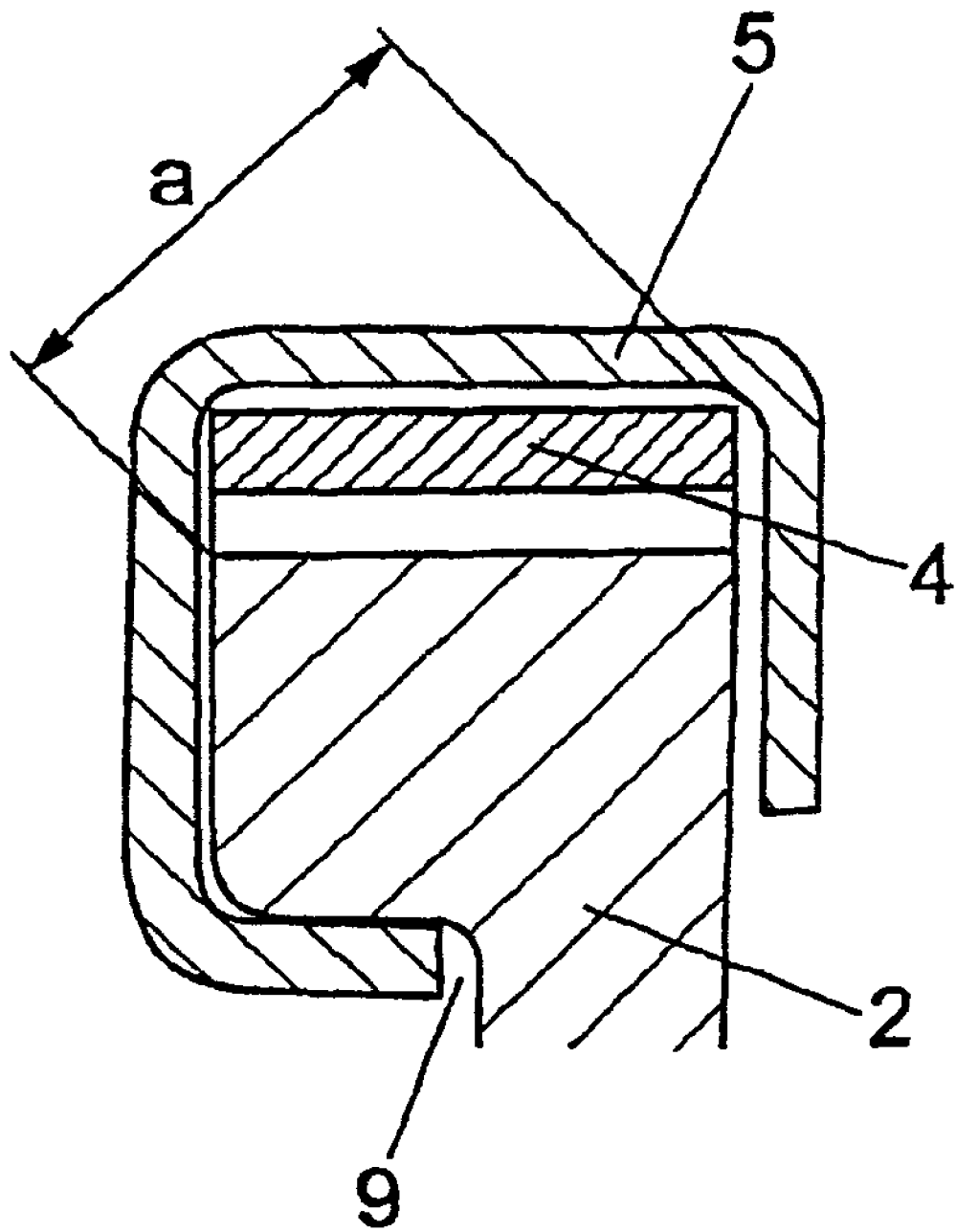
FIG. 20 shows a partial detail of the brake pad according to FIG. 19 in a cross section according to the line XX-XX in FIG. 19.

As is to be further seen in FIG. 19, the pad retaining spring 4 has stops 31 which are formed on both sides of the hood 5 and extend at least to one side transversely to the longitudinal direction of the pad retaining spring 4. In this case, the cross-sectional diagonal "a" (FIG. 20) of the hood 5, in interaction with the pad carrier plate 2 in the covering region of the pad retaining spring 4, is smaller than the width of the pad retaining spring 4 in the region of the respective stop 31.

TABLE OF REFERENCE NUMERALS

1. Brake pad
2. Pad carrier plate
3. Friction pad
4. Pad retaining spring
5. Hood
6. Lug
7. Tooth
8. Tongue
9. Slot
10. Recess
11. Boss
12. Hole
13. Region start
14. Stop
15. Spring leg
16. Pressure piece
17. Slot
18. Cut-out
19. Stop plate
20. Insertion slot
21. Side
22. Stop bar
23. Insertion bevel
24. Cut-out
25. Recesses
26. Ribs
27. Brake caliper
28. Brake disc
29. Retaining clip
30. Longitudinal slot
31. Stop The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disc brake, comprising:
   a brake pad carrier plate carrying a friction pad;
   a pad retaining spring formed as an arc-shaped leaf spring, the pad retaining spring being retained in a radially deflectable manner on an upper edge of the brake pad carrier plate; and
   a hood fastened to the pad retaining spring, the pad retaining spring being connected with positive interlock to the brake pad carrier plate by way of the hood which fits over and extends below the pad retaining spring, wherein interlocking elements of the hood and brake pad carrier plate are configured to allow radial deflection of the pad retaining spring on the upper edge of the brake pad carrier plate.

2. The brake pad as claimed in claim 1, wherein the hood is permanently connected to the carrier plate.

3. The brake pad as claimed in claim 1, wherein the hood has a tongue, which engages in a recess of the carrier plate, said tongue, in an untensioned end position, abutting against a stop which delimits the recess.

4. The brake pad as claimed in claim 3, wherein the hood has at least one tooth, which is adjacent to the tongue and engages in a slot of the pad carrier plate, the slot extending parallel to the recess.

5. The brake pad as claimed in claim 4, wherein at least one of the recess and the slot are provided on a rear side of the pad carrier plate, which rear side faces away from the friction pad.

6. The brake pad as claimed in claim 1, wherein the hood is connected by one of positive locking and material bonding to the pad retaining spring.

7. The brake pad as claimed in claim 1, wherein the hood in cross-section has an approximate U-shape, and fits over the pad retaining spring in a middle region thereof.

8. The brake pad as claimed in claim 1, wherein the pad carrier plate has formed-on lugs against which the pad retaining spring abuts.

9. The brake pad as claimed in claim 8, wherein the pad retaining spring abuts laterally against the lugs.

10. The brake pad as claimed in claim 8, wherein the pad retaining spring has a slot arranged at each end, the slot being arranged approximately in a mid portion of the width of the retaining spring and extending in a longitudinal axial direction; and
wherein the formed-on lugs of the pad carrier plate are guided in the slots, the lugs being arranged in a mid portion of the width of the pad carrier plate.

11. The brake pad as claimed in claim 1, wherein the hood is fastened in a middle region of the pad carrier plate which faces the pad retaining spring.

12. The brake pad as claimed in claim 1, wherein the pad retaining spring has at least two regions with different spring characteristics.

13. The brake pad as claimed in claim 12, wherein the pad retaining spring, in a region covered by the hood, has a more progressive spring force characteristic compared with adjacent spring legs.

14. The brake pad as claimed in claim 1, wherein the hood has a tongue, which is guided through a recess of the pad carrier plate formed as an opening, and by its free end is supported in a cut-out of the hood.

15. The brake pad as claimed in claim 1, wherein the hood is retained on the pad carrier plate by a stop plate, the hood being substantially U-shaped; and
wherein the stop plate is guided through insertion slots formed in two opposite sides of the U-shaped hood, the stop plate completely penetrating a recess which is formed as an opening in the pad carrier plate.

16. The brake pad as claimed in claim 15, wherein the stop plate on one end has a stop bar, which abuts against an outer side of one of the two opposite sides of the U-shaped hood.

17. The brake pad as claimed in claim 15, wherein the stop plate is connected to the hood in a fixed manner.

18. The brake pad as claimed in claim 1, wherein the pad carrier plate, on a rear side facing away from the friction pad, has at least one pressure piece formed in one piece, upon which an element of an application device of the disc brake can be pressed.

19. The brake pad as claimed in claim 18, wherein the pad carrier plate, on a rear side facing away from the friction pad, has two pressure pieces, and further wherein each pressure piece has a recess.

20. The brake pad as claimed in claim 19, wherein the pressure pieces have radially extending ribs.

21. The brake pad as claimed in claim 1, wherein the pad retaining spring on two end regions has elongated hole-shaped longitudinal slots, which are arranged approximately in a middle and extend in a longitudinal direction, and in which are guided lugs of the carrier plate which, with regard to a thickness of the carrier plate, are arranged in the middle.

22. The brake pad as claimed in claim 21, wherein the length of the longitudinal slots is greater than the length of the lugs.

23. The brake pad as claimed in claim 1, wherein the pad retaining spring, in regions adjacent to the hood, has in each case at least one stop which extends transversely to the longitudinal direction of the pad retaining spring, wherein the width of the pad retaining spring in the region of the stops is greater than a clear width of the hood.

24. The brake pad as claimed in claim 23, wherein a common cross-sectional diagonal of the hood and of the brake pad in the covering region of the pad retaining spring is smaller than the width of the pad retaining spring in the region of the respective stop.

* * * * *